United States Patent
Reeves, Jr. et al.

(10) Patent No.: US 10,195,791 B1
(45) Date of Patent: Feb. 5, 2019

(54) WELDED REINFORCEMENT FOR INFLATABLE DEVICES

(71) Applicant: Air Cruisers Company, LLC, Wall Township, NJ (US)

(72) Inventors: Joseph D. Reeves, Jr., Avenel, NJ (US); Enrique Soto Delgado, Toms River, NJ (US); Ruben Salinas, Chihuahua (MX); Adrian Marquez, Chihuahua (MX); Haithum Salem, Old Bridge, NJ (US)

(73) Assignee: Air Cruisers Company, LLC, Wall Township, NJ (US)

( * ) Notice: Subject to any disclaimer, the term of this patent is extended or adjusted under 35 U.S.C. 154(b) by 0 days.

(21) Appl. No.: 15/453,079

(22) Filed: Mar. 8, 2017

Related U.S. Application Data

(60) Provisional application No. 62/306,509, filed on Mar. 10, 2016.

(51) Int. Cl.
| | |
|---|---|
| *B29C 65/00* | (2006.01) |
| *B29C 65/18* | (2006.01) |
| *B63C 9/04* | (2006.01) |
| *B64D 25/14* | (2006.01) |
| *B64D 25/18* | (2006.01) |
| *B29L 22/02* | (2006.01) |

(52) U.S. Cl.
CPC ............ *B29C 66/439* (2013.01); *B29C 65/18* (2013.01); *B63C 9/04* (2013.01); *B64D 25/14* (2013.01); *B64D 25/18* (2013.01); *B29K 2995/0067* (2013.01); *B29L 2022/02* (2013.01); *B63C 2009/042* (2013.01)

(58) Field of Classification Search
CPC ......... B29C 66/439; B29C 65/18; B63C 9/04; B63C 2009/042; B64D 25/18; B64D 25/14; B29L 2022/02; B29K 2995/0067
See application file for complete search history.

(56) References Cited

U.S. PATENT DOCUMENTS

| | | | | |
|---|---|---|---|---|
| 3,512,196 A | * | 5/1970 | Carroll | B63C 11/06 441/116 |
| 3,919,027 A | * | 11/1975 | Jones | B29C 53/36 428/12 |
| 5,909,895 A | * | 6/1999 | Iino | B29C 65/04 280/728.1 |
| 6,142,520 A | * | 11/2000 | Iino | B29C 65/04 280/728.1 |
| 7,467,496 B1 | | 12/2008 | Cuisset et al. | |

* cited by examiner

*Primary Examiner* — David Sample
*Assistant Examiner* — Donald M Flores, Jr.
(74) *Attorney, Agent, or Firm* — Kilpatrick Townsend & Stockton LLP; Dean W. Russell; Kristin M. Crall

(57) ABSTRACT

Embodiments of the present invention provide reinforcements for inflatable device assemblies. Specific embodiments provide a welded reinforcement for crotch areas of inflatable devices. Particular benefits may be achieved when the areas to be reinforced with the reinforcement system described are non-linear, defining a geometry with at least one curve or angle. Specific aspects of the reinforcement system provide one or more precut gusset elements that are configured to be secured with respect to a crotch area of a base substrate and welded.

16 Claims, 10 Drawing Sheets

WELDED REINFORCEMENT FOR INFLATABLE DEVICES

CROSS REFERENCE TO RELATED APPLICATIONS

This application claims the benefit of U.S. Provisional Application Ser. No. 62/306,509, filed Mar. 10, 2016, titled "Continuous Heat Sealed Reinforcement of the Crotch Areas of Nonlinear Heat Sealed Bonds Using Tape that has Pre-cut Gussets (Gusseted Heat Seal Reinforcement)," the entire contents of which are hereby incorporated by reference.

FIELD OF THE DISCLOSURE

Embodiments of the present disclosure relate generally to reinforcements for inflatable device assemblies. Specific embodiments provide a welded reinforcement for crotch areas of inflatable devices. Particular benefits may be achieved when the areas to be reinforced with the reinforcement system disclosed are non-linear, defining geometry with at least one curve or angle. Specific aspects of the reinforcement system provide one or more precut gusset elements that are configured to be secured with respect to a crotch area and welded.

BACKGROUND

Federal aviation safety regulations require aircraft to provide evacuation and other safety provisions for passengers. These include evacuation slides, evacuation slide/rafts, life rafts, life vests, and other life-saving inflatable devices. Inflatable evacuation slides and/or evacuation slide/raft assemblies are commonly carried onboard a passenger aircraft. These inflatable devices are intended to serve as a slide during evacuation of the aircraft and may also be used as a raft if the evacuation occurs over water. Some aircraft carry separate evacuation slides and life rafts. All of these options are generally referred to herein as "inflatable devices."

Inflatable evacuation slides and rafts are generally built from an assembly of inflatable tubular structures that form airbeams that are secured to one another. Inflatable evacuation slides and rafts also have non-airholding features, such as patches, floors, sliding surfaces, girts, ramps, handles, inflation ports, canopies, and other features that must be secured to the assembled inflatable device. Such securement between tubes and other accessories has typically been done with a contact cement, which is much like an adhesive or glue. This material is generally strong, but it takes quite some time for drying in between steps. The required drying time (often overnight) can extend the manufacturing time of an evacuation slide and/or evacuation slide/raft to up to a few days or longer.

Securement areas may also require reinforcement. Fabric layering of adjacent support structures is a common method of reinforcement. This reinforcement is typically done with straight tapes. Secondary steps or processes are also often required. Many constructions are fin or prayer seams that are exposed to peel forces. Fin or prayer seams with peel forces are not as strong as seams that are in shear. A failed fin or prayer seam is illustrated by FIGS. 12A-D, illustrating perspective and cross-sectional views. It is thus desirable to provide improved securing and reinforcement systems.

BRIEF SUMMARY

Embodiments described herein thus provide systems and adhesive-free methods for reinforcing an inflatable device at a joint or other location where two inflatable devices are to be secured to one another or where an accessory is to be positioned. Gusseted reinforcement elements are cut and folded in a way that places them in a shear failure mode. Unlike traditional reinforcements, no adhesives are required to install the reinforcements. Instead, the reinforcements are secured in place via welding. Welding methods include, but are not limited to: thermal welding, hot air welding, heated wedge welding, heated rotary wheel welding, hot stamp welding, ultrasonic welding, and radio frequency (RF) welding. All of these options are generally referred to herein as "welding." The term "welding" is used herein to refer to any methods or steps that cause two separate materials to flow into one another. In one example, the entire perimeter of the reinforcement location is welded to join the fabric in a way that increases strength and increases resistance to peel or shear of the joined materials when subjected to dynamic loads in unpredictable directions.

In one example, there is provided a welded reinforcement that has a flexible base substrate material comprising a crotch portion, the crotch portion created without adhesives and defining a geometry with at least one curve or angle; and a first gusset reinforcement element comprising a plurality of gusset cuts, the first gusset reinforcement element configured to fit within the crotch portion and to be welded in place without the use of adhesives. The crotch portion may be formed by welding two layers of base substrate material to one another. It is possible to provide the first gusset reinforcement element with at least one non-coated surface facing externally from the crotch portion. The non-coated surface is folded upon itself when the reinforcement seal is compressed and welded. In another example, a buffer element configured to fit around the first gusset reinforcement element to prevent the first gusset reinforcement element from welding to itself upon application of a welding process. It is further possible to provide a second gusset reinforcement element interposed between the base substrate and the first gusset reinforcement element, the second gusset reinforcement element comprising a coating on its upper surface and a coating on its lower surface.

Examples also relate to a method of reinforcing an inflatable device, comprising: providing a gusseted and welded reinforcement; and installing the reinforcement seal on the inflatable device.

DETAILED DESCRIPTION

The inflatable devices described herein are generally referred to as evacuation slides and evacuation slides/rafts, but it should be understood that the components and methods described may be used for the manufacture of any other type of inflatable structures that may benefit from securing, adhering, or otherwise attaching two or more tubes or other shaped structures together, attaching additional features to the inflatable device, or reinforcement of certain areas of the inflatable device. The components and methods described may also be used for securing, adhering, or otherwise attaching one or more inflatable structures to an accessory or other structure, such as an inflation port, a sliding surface, a raft floor, a handle, a girt, a ramp, a canopy, or any other appropriate structure.

Although described with respect to life-saving inflatable devices such as evacuation slides and evacuation slides/rafts, it is also possible for this disclosure to be used in connection with other inflatable devices or equipment, including, but not limited to, other emergency inflatables or floats, emergency flotation systems, life preservers/vests, inflatable shelters (military and nonmilitary), aviation life rafts, marine life rafts, ship decoys and inflatable military targets, and any other floatation devices, rescue equipment, or other safety device requiring rapid inflation and secure air-holding functions.

The reinforcement systems described herein protect against peeling and/or shear of welded materials in applications that are exposed to dynamic and unpredictable load directions. Straight reinforcement tapes that terminate at each end without overlap are exposed to these peeling affects over time at the termination points (unless they are protected with an additional process step, which adds time and expense to the manufacturing process). Use of straight tapes to reinforce a nonlinear location may also result in undesirable bunching of the tapes.

Instead, there is described a system that provides welded reinforcement of crotch areas of non-linear and linear welded attachments. The welded reinforcement may be continuous or non-continuous. The reinforcement is done using welded tape that has pre-cut gussets. The addition of a gusset pattern to the welded reinforcement tape prevents bunching along a non-linear portion. It also provides creation of a continuous reinforcement geometry. The use of the term "non-linear" herein refers to a location at which a seam or area to be reinforced changes direction. "Non-linear" includes curves, angles, or any other dimension that is not a 180° straight line. The reinforcements provide benefits for a geometry with at least one curve or angle.

Figure 1A:
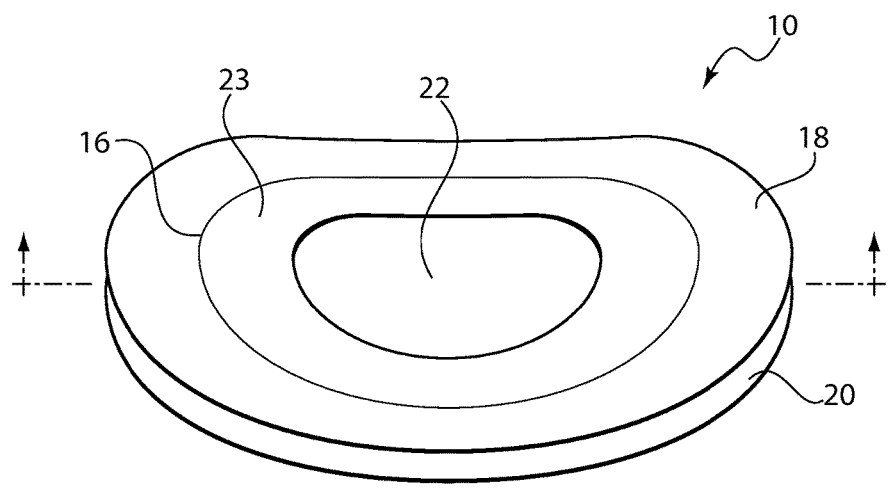
FIGS. 1A and 1B show a top perspective view and side cross-sectional view, respectively, of a base substrate.
Figure 1B:
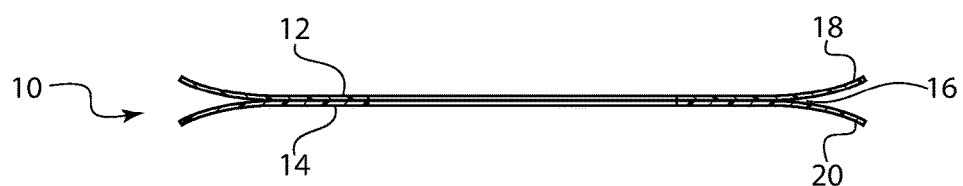

Referring now to the figures, FIG. 1 illustrates a base substrate 10. The base substrate 10 has two material layers 12, 14, as illustrated by the cross-sectional view of FIG. 1B. The material layers are welded along an interior welded portion 23 to create a crotch seal 16. The crotch seal 16 forms a point of a "V." Extending flaps 18, 20 form the sides of the "V." The crotch seal 16 may be formed using any appropriate procedures.

In a specific embodiment, this seal is made via welding. This can include using hot air, heated dies, high frequency electromagnetic waves (RF welding), ultrasonic acoustic vibrations (ultrasonic welding), thermal welding, heated wedge welding, heated rotary wheel welding, or hot stamp welding to melt or soften the fabric of the base substrate (or gusset reinforcement element and/or the inflatable structure, as described further below) so that the two materials are welded to one another in a secure connection.

Figure 5:
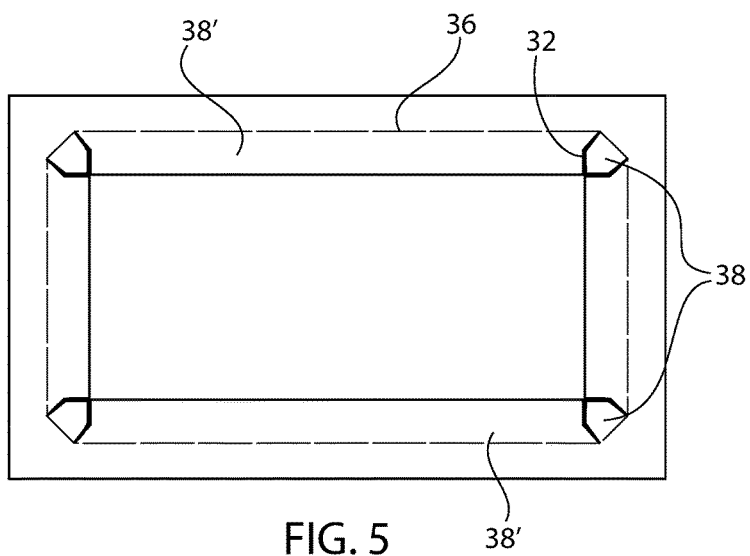
FIG. 5 shows a top plan view of a rectangular gusset reinforcement element.

One example of forming the crotch seal 16 includes using a heated die to make the internal seal. The material layers 12, 14 may be aligned with one another. The die is placed on the material layers 12, 14. If the manufacturing location has a die of the complete shape corresponding to the internal shape 22, that is optimal to create a full seal at once. Otherwise, a die having only a portion of the shape may be used in multiple steps. The figures illustrate the base substrate 10 having an internal shape 22 that is generally round, oval, or elliptical. It should be understood, however, that any internal shape is possible and may be used. Non-limiting and common examples include a square, rectangle, or triangle shape, depending upon the reinforcement location being addressed. For example, FIG. 5 illustrates a rectangular reinforcement assembly.

The resulting step provides a welded portion 23 of the two material layers 12, 14. In many instances, one or both of the layers of material have a gas barrier coating or other layer that prevents air seepage. The external surface of each layer will generally have a gas barrier coating so that the inflatable device may function as intended. The internal surface of each layer may also have a gas barrier coating. The present inventors have determined that the use of heat applied to such coatings in connection with a gusseted seal can create a seal that eliminates the need for time-consuming adhesives used for securement. A common gas barrier coating is polyurethane, but it should be understood that other coatings are possible and considered within the scope of this disclosure. For example, the present assignee has applications pending that relate to various gas barrier coatings that may be used to reduce weight of the inflatables, as well as provide improved gas barrier properties.

Figure 2:
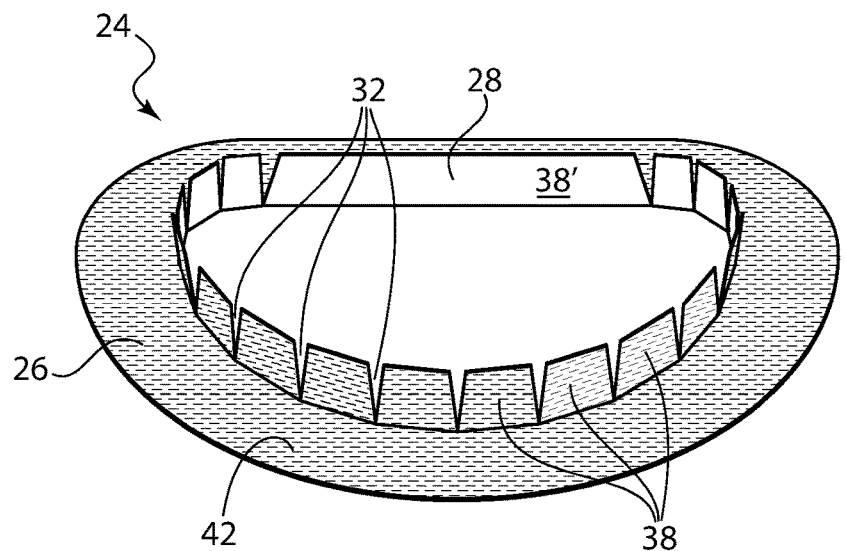
FIG. 2 shows a top perspective view of one example of a gusset reinforcement element.
Figure 3:
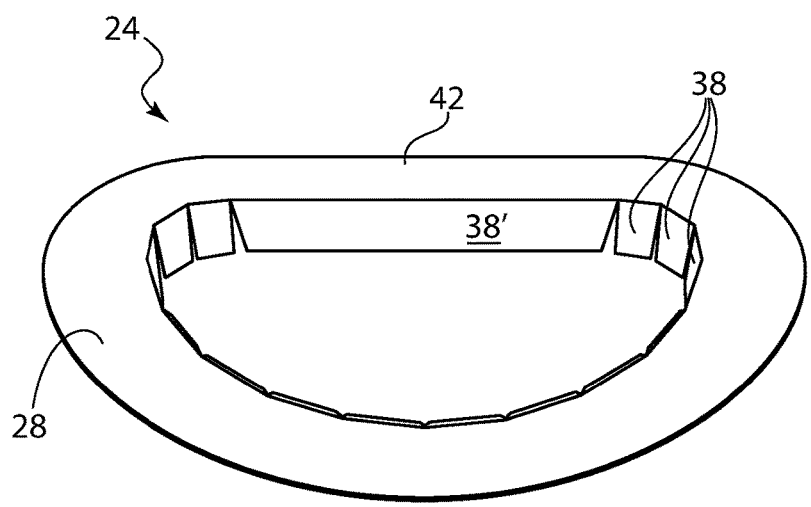
FIG. 3 shows a bottom perspective view of the gusset reinforcement element of FIG. 2.

Reinforcement of the crotch seal 16 area can then take place by use of one or more gusset reinforcement elements. FIGS. 2 and 3 illustrate an exemplary gusset reinforcement element 24. At least one of the upper or lower surfaces 26, 28 of the element 24 remains uncoated. (In FIGS. 2 and 3, the shading on FIG. 2 represents a coating on the surface 26, while the unshaded surface 28 is uncoated.) For a doubly reinforced seal, two gusset reinforcement elements 24, 44 may be used, as illustrated by FIG. 8. In this figure, a first gusset reinforcement element 24 has both of its surfaces coated. A second gusset reinforcement element 44 has at least one surface 28 that is uncoated, with its other surface 26 having a coating. Although two or more gusset reinforcement elements may be used, it is possible to create the desired reinforcement using only a single gusset reinforcement element 24. Accordingly, a single gusset reinforcement element 24 will be described with respect to FIGS. 2-4 and 6-7, but it should be understood that multiple elements may be manufactured as described and used in conjunction with one another.

The material of the gusset reinforcement element 24 may be a weldable tape, generally manufactured out of the same material as the inflatable device. However, it is also possible that the element material is a material that is stronger than the inflatable device material. In other examples, it is possible for the element material to be a material that is weaker than the inflatable device material. Non-limiting examples include an accessory material, a patch material, a reinforcement material, a floor material, a girt material, a canopy material, a gas barrier material, a non-gas barrier material, a conductive material, or any other appropriate material.

Figure 4:
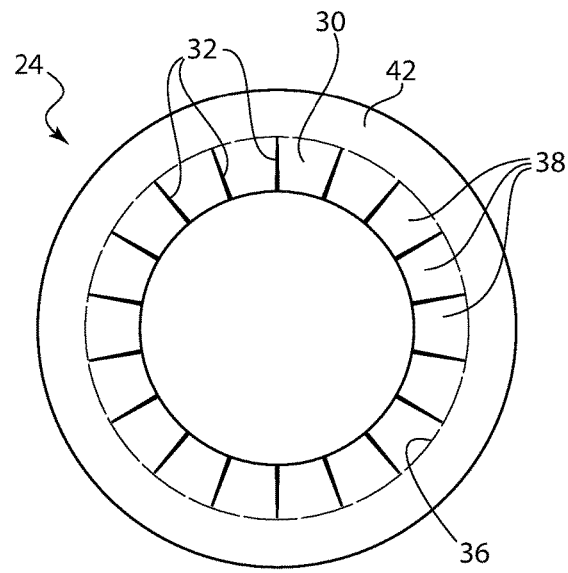
FIG. 4 shows a top plan view of an alternate gusset reinforcement element prior to being folded.

Referring back now to the details of the gusset reinforcement element 24, FIG. 4 illustrates an interior portion 30 created by cuts 32. The remaining portion of the element defines an external strip 42. FIG. 4 illustrates an element 24 prior to being cut, with angled cuts 32 and a fold mark 36 indicated. It is possible to provide any number of cut 32. In one specific example, there is one gusset for every inch of circumference.

Once the interior portion 30 is cut along the cuts 32, individual gussets 38 are formed. The individual gussets 38 are folded along the fold mark 36, resulting in the gusset reinforcement element 24 illustrated by FIGS. 2 and 3. This gusset reinforcement element 24 shown by FIGS. 2 and 3 is illustrated as generally having a curved D-shape. The gussets 38 along the curved portion of the "D" are formed from a plurality of continuous cuts. The gusset 38' along the straighter portion of the "D" is formed with fewer cuts. This is generally because material bunching will not occur along a linear or straight portion. The element 24 of FIG. 4 is more circular, and accordingly, it is formed from a continuous plurality of gusset cuts. The element of FIG. 5 is rectangular, and accordingly, it is formed from fewer gusset cuts, with shorter side gussets 38 and longer straight gusset portions 38' provided. In these embodiments, gusset cuts 32 are required where an angle takes place or where the shape otherwise changes direction. The gussets 38, 38' are folded along the fold line 36. The more changes in direction that the crotch seal has, the more gusset cuts 32 that may be necessary.

It should be understood that the gusset reinforcement element 24 may be designed as having any appropriate shape. The shape of the gusset reinforcement element 24 should generally align with or otherwise match the shape of the welded portion 23 defining the crotch seal 16.

Figure 6:
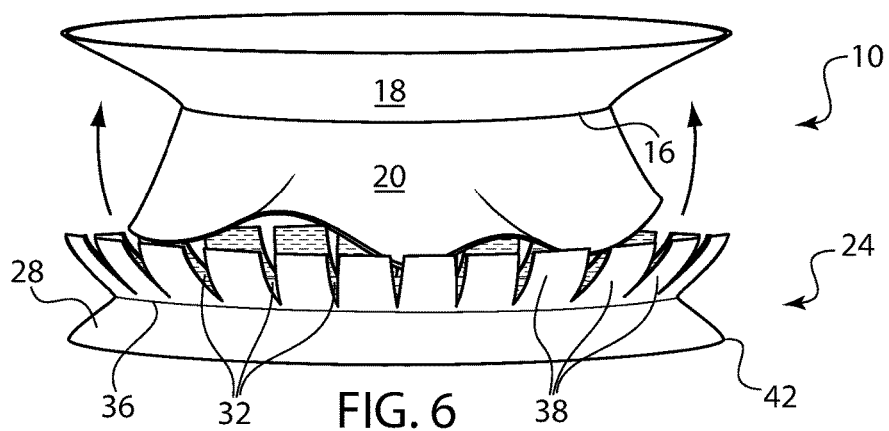
FIG. 6 shows a side perspective view of a gusset reinforcement element being positioned on a base substrate having a crotch seal.

Once the base substrate 10 is created with the welded portion 23 (for which no adhesives are required) between the two layers of material 12, 14, one or more layers of the gusset reinforcement elements 24 may be secured with respect thereto. As illustrated by FIG. 6, a first gusset reinforcement element 24 is positioned in the crotch seal 16. This is done by positioning the fold line 36 in the V-portion of the crotch seal 16. The individual gussets 38 will generally lie against one of the extending flaps 18. The external strip 42 of the element 24 will generally lie against the other extending flap 20.

Figure 7:
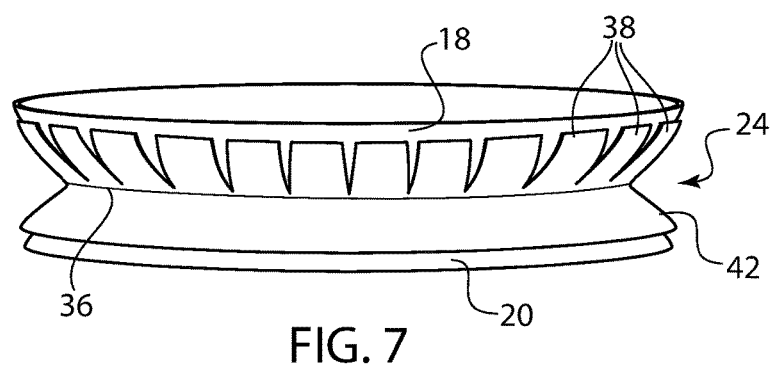
FIG. 7 shows the assembly resulting from the steps of FIG. 6.
Figure 8:
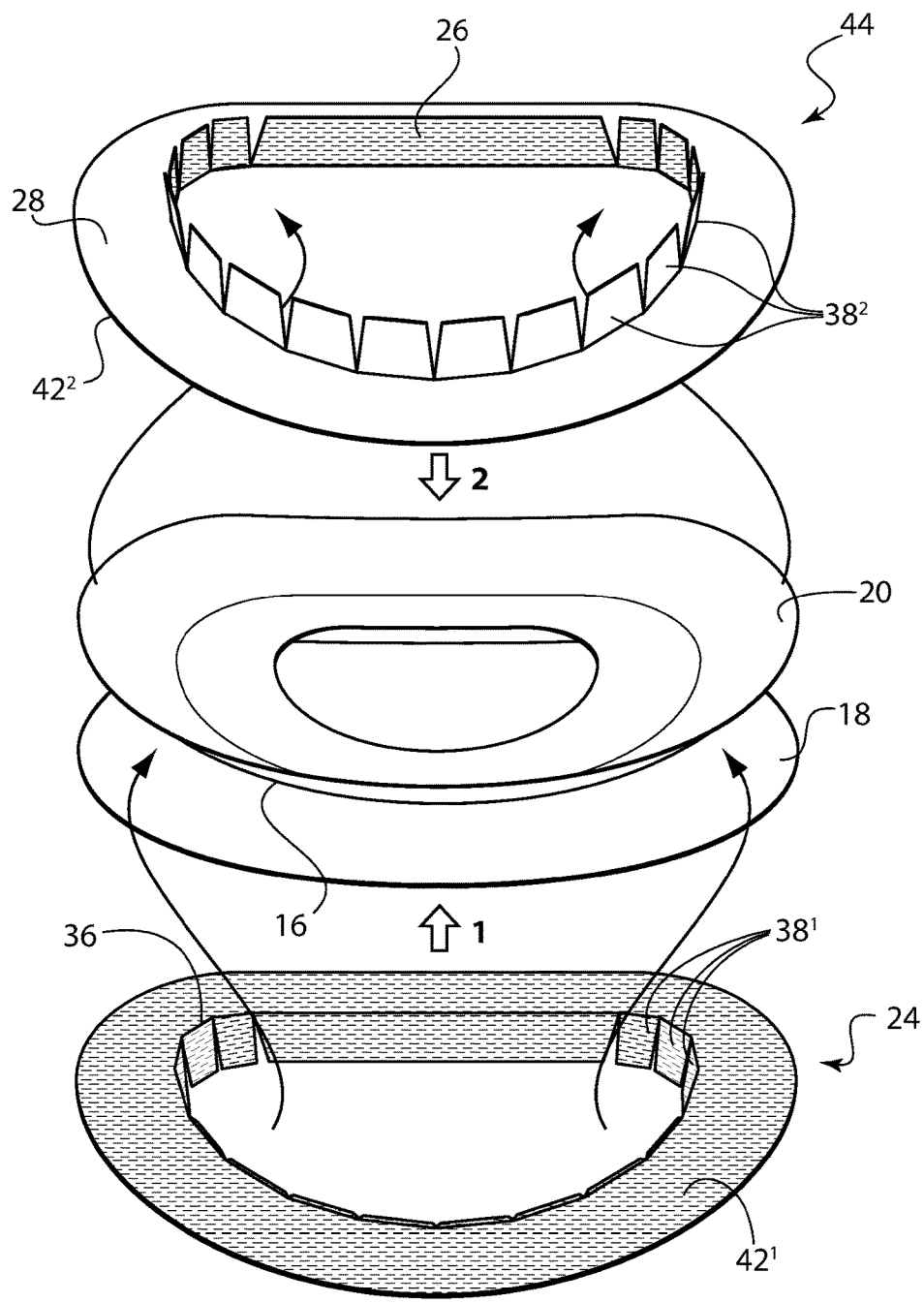
FIG. 8 shows one example of an assembly sequence for a reinforcement assembly described herein.

This process of installing a single gusset reinforcement element 24 is illustrated by FIGS. 6 and 7. In this instance, the uncoated surface 28 should face outwardly. Folding along the cuts 32 causes splaying of the individual gussets 38. Folding of the individual gussets 38 over and with respect to the external strip 42 means that (1) bunching of the gusset material is prevented because they are spread out as illustrated, and (2) the "V" portions created by cuts 32 define splayed gussets 38 that overlap with strip 42. Accordingly, when the completed reinforcement assembly 50 of a base substrate 10 and a gusset reinforcement element 24 is pressed from the top with application of heat, the individual gussets 38 fold over and onto the external strip 42. Contacting surfaces gussets 38 and strip 42 are uncoated such that application of the heat will not allow them to be sealed to one another. The reinforcement gusset element surfaces that face toward the flaps 18, 20, however, do have a layer of coating such that heat sealing causes the flap-facing surface of the gussets 38 to be sealed to the external flap 18 and the flap-facing surface of the external strip 42 to be sealed to the external flap 20.

Figure 9:
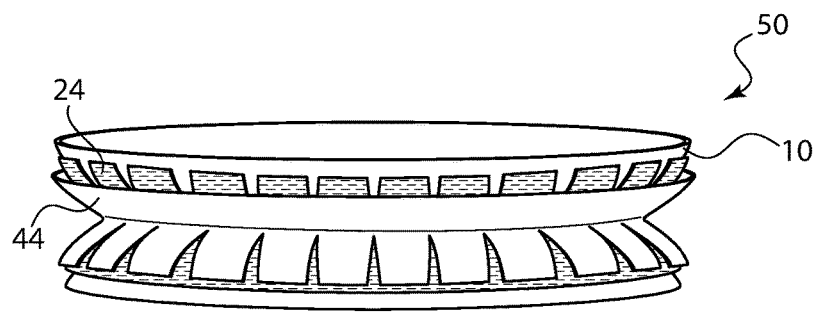
FIG. 9 shows a second reinforcement element positioned over the assembly of FIG. 8.

FIG. 8 shows the use of two gusset reinforcement elements 24, 44. In this example, the first gusset reinforcement element 24 to be placed within the welded crotch seal 16 has both of its surfaces 26, 28 coated. This can allow extra reinforcement, by allowing heat sealing of the element surfaces to both (a) the extending flaps 18, 20 as well as (b) to an external surface of the second gusset reinforcement element 44. The second gusset reinforcement element 44 in this example is then placed along the external surface of the fold line 36 of the first gusset reinforcement element 24. The placement is done such that the gussets $38^1$ of the first gusset reinforcement element 24 face toward one of the external flaps 18, and the gussets $38^2$ of the second gusset reinforcement element 44 face toward the other external flap 20. This completed reinforcement is illustrated by FIG. 9. As shown, the second gusset reinforcement element 44 (or whichever reinforcement element is the external element) has an uncoated surface 28 that faces outwardly, as described above. The coated surface 26 of the gussets $38^2$ faces the external strip $42^1$ of the first gusset reinforcement element 24. The coated surface 26 of the of the external strip $42^2$ faces the gussets $38^1$ of the first gusset reinforcement element 24.

Figure 14A:
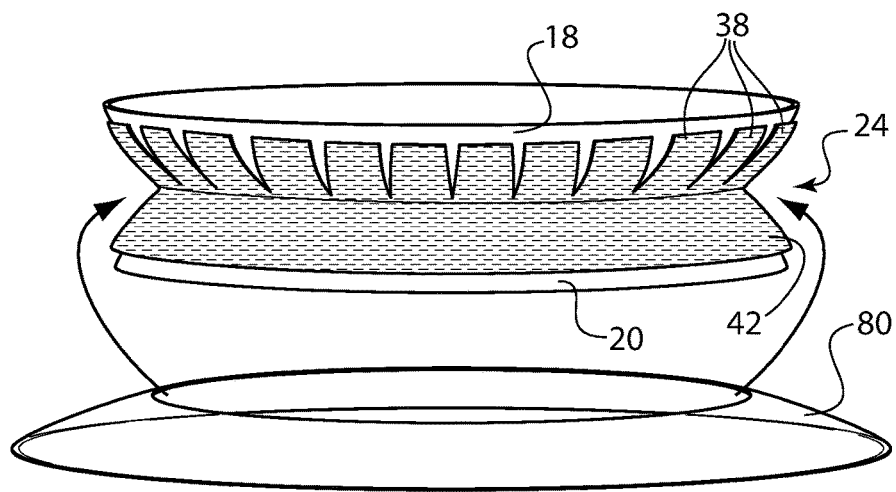
FIG. 14A shows a side perspective view of a buffer that may be used for creation of the welded reinforcement.
Figure 14B:
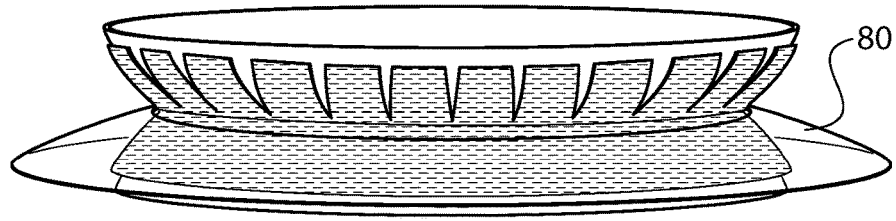
FIG. 14B shows a side perspective view of the assembly of FIG. 14A, with the buffer in place.

Providing the external surface of the gusset reinforcement element as being non-coated prevents the gusset reinforcement element from adhering to itself upon application of heat or any other form of welding. FIGS. 14A and 14B illustrate an alternate embodiment that uses a buffer element 80. In this example, it is possible for the gusset reinforcement element 24 to have an external coated surface. To prevent the coated surface from adhering or welding to itself upon application of heat or other welding methods, an intermediate buffer element 80 may be used. This buffer element 80 is illustrated as being a ring, generally having an internal opening that receives the base substrate 10 and gusset reinforcement element 24 assembly. The buffer 80 is seated in the fold line, as illustrated by the arrow in FIG. 14A and as shown by FIG. 14B. The buffer 80 is generally a material that is non-adherent to the coating of the gusset reinforcement element 24. Non-limiting examples include polyethylene, Teflon, Mylar, or any other non-adherent material. The buffer serves the function of the non-coated external surface. Once the final weld has taken place, the buffer 80 may be removed (although it is also possible to leave the buffer in place, if desired).

Figure 10A:
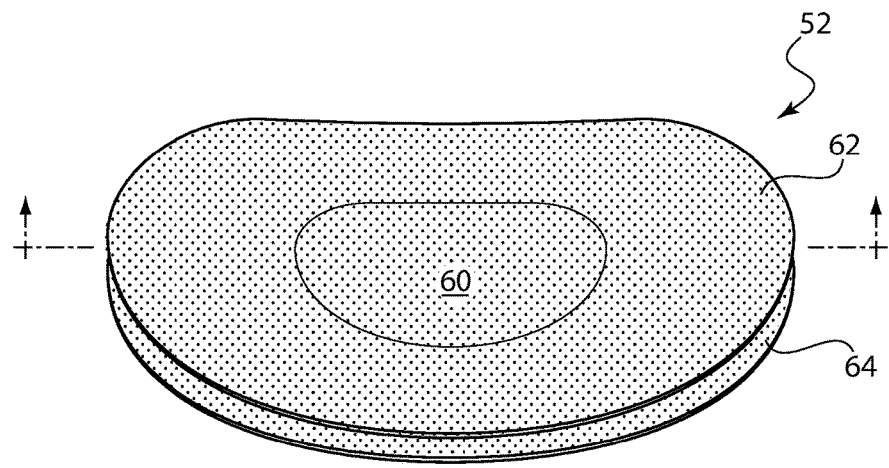
FIGS. 10A and 10B show a top perspective view and side cross-sectional view, respectively, of a patch that may be positioned with respect to the completed reinforced assembly.
Figure 10B:
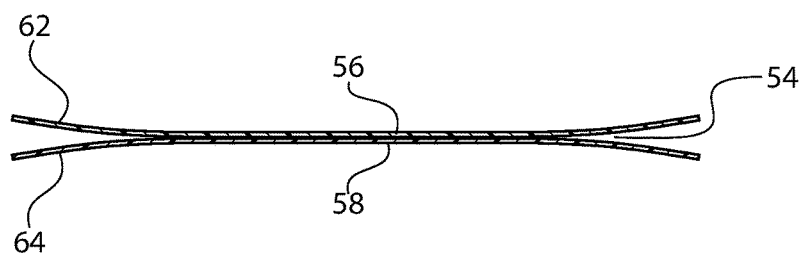

Once the assembly 50 has been formed, a patch 52 may be positioned with respect to the most external gusset reinforcement element. An exemplary patch is illustrated by FIGS. 10A and 10B. The patch 52 is formed as having a similar heat seal crotch area 54 between two material layers 56, 58. The patch 52 may have a solid center 60, as illustrated by FIG. 10A. It is also possible, however, for the patch 52 to be provided with an internal opening instead of a solid center 60. For example, if airflow is desired between the elements to be secured to one another at the reinforcement location, an internal opening may be provided.

Figure 11A:
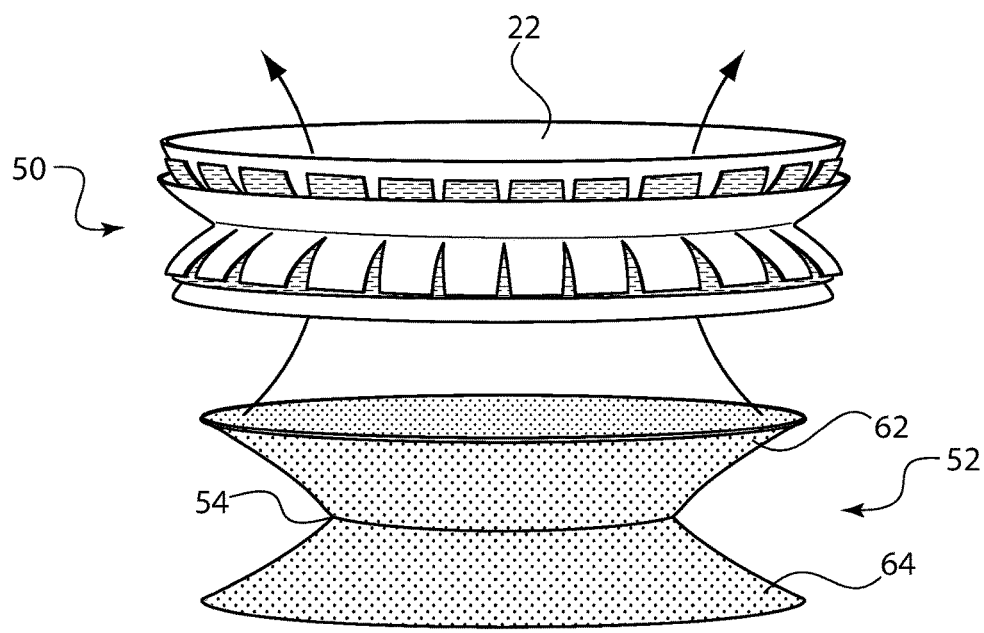
FIGS. 11A and 11B show assembly steps of a patch being positioned over a completed reinforcement assembly.
Figure 11B:
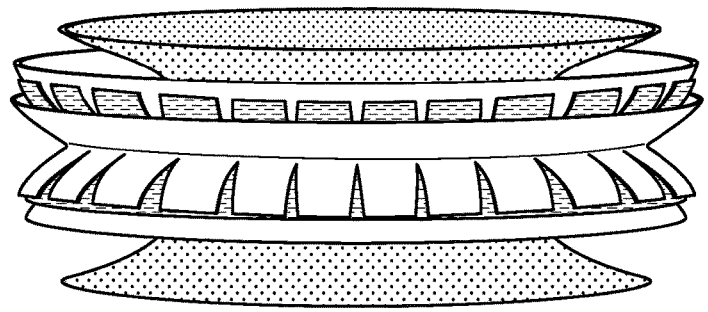

In order to secure the patch 52 to the completed gusset assembly 50, the external flaps 62, 64 defined by the sealed crotch 54 are separated and inserted into the internal shape 22 of the base substrate. The sealed crotch 54 abuts the welded portion 23. One example of assembly is illustrated by FIGS. 11A and 11B.

Figure 12A:
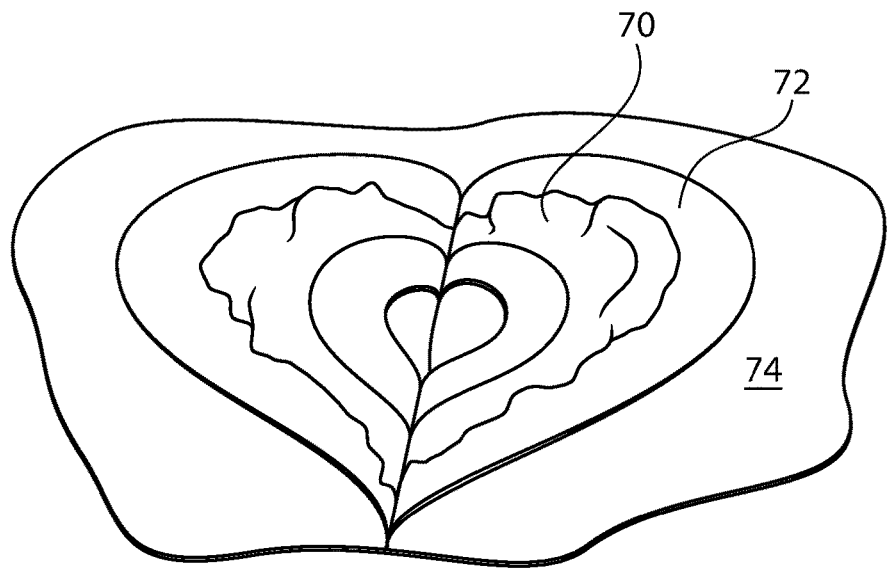
FIG. 12A shows a perspective view of a failed fin or prayer seam of the prior art.
Figure 12B:
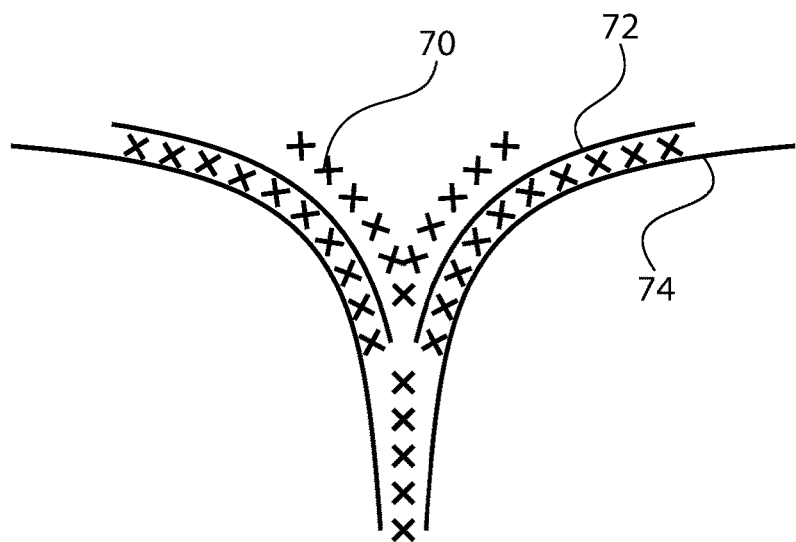
FIG. 12B shows a side cross-sectional view of the failed fin or prayer seam of FIG. 12A.
Figure 12C:
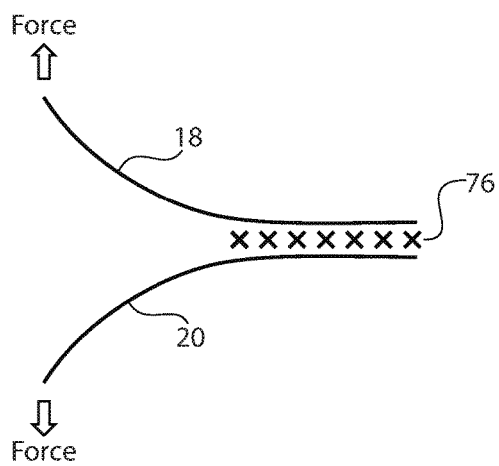
FIGS. 12C and 12D show alternate failed fin or prayer seams.
Figure 12D:
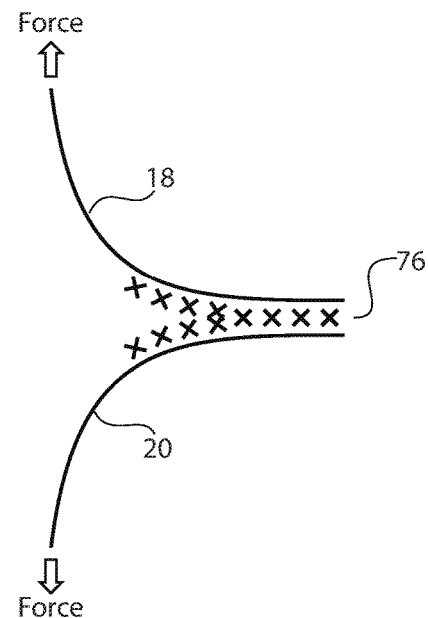
Figure 13A:
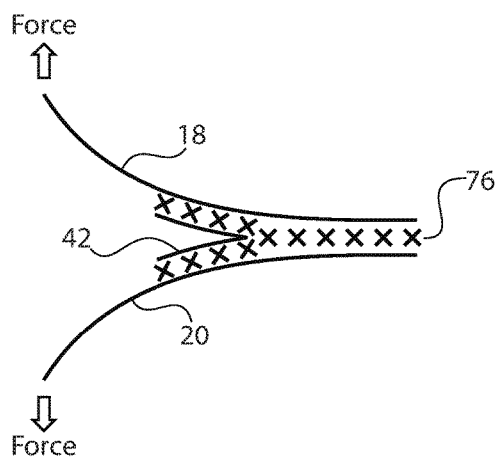
FIGS. 13A and 13B show side cross-sectional schematic views of a welded reinforcement upon application of force in the direction of arrows.
Figure 13B:
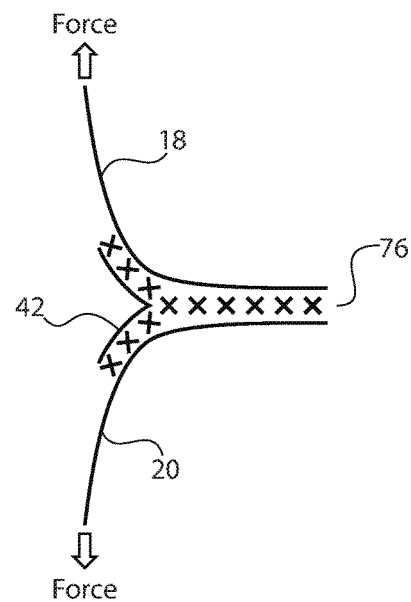

In summary, when angled cuts 32 of a reinforcement gusset element 24 are folded, the angled cuts allow for, or otherwise define, folded gussets 38. This allows for (continuous or non-continuous, depending on the size and number of individual gussets 38 provided) reinforcement of a crotch seal area 16 that changes direction, such as on the outside of a circular or rectangular shaped weld area 23. Folding the gussets 38 places them in a shear failure mode. This reinforcement system protects against peeling and/or shear of joined materials in applications that are exposed to dynamic and unpredictable load directions. Examples of failed or peeled fin or prayer seams are illustrated by FIGS. 12A-12D. FIG. 12A illustrates an inflatable tube panel 74 with a reinforcement 72 with a failed adhesive 70. The cross-sectional view of FIG. 12B illustrates how the adhesive 70 can peel apart. FIG. 12C illustrates inflatable tube layers 18, 20 with a weld area 76 therebetween. FIG. 12D illustrates how the weld 76 can peel apart upon application of force in the direction of force arrows. Adding one or more layers of the gusset reinforcements disclosed herein (which can be various shapes, numbers, and sizes, and which can be oriented in various directions) provides varying degrees of reinforcement strength, depending on the application and geometry of the welded area. FIGS. 13A and 13B show side cross-sectional schematic views of a welded reinforcement upon application of force in the direction of arrows, illustrating that the reinforcement does not fail upon application of force.

Additional adjacent support structures often add additional process steps and or bulk. No adhesives are required to install this new type of reinforcement. Instead, the weld creates the initial crotch seal and a secondary weld (once the gusset reinforcements are positioned as shown and described) creates the gusset seal.

Testing Data:

Two different geometries of gusseted tape reinforcements were created and installed around the perimeter of a welded area, attached to inflatable structures, and load tested. One was a rectangular reinforcement and one was a circular reinforcement. The rectangular geometry was tested to max load attached to the floor of a raft on which 15,000 lbs. was applied with no failure. The circular geometry was tested to failure by being pulled with a fork lift attached to the inflatable structure of a slide. The inflatable structure failed before the reinforcement.

Materials:

The materials used in connection with this disclosure should generally have appropriate air-holding features and flame resistance, appropriate friction to allow passenger sliding, sufficient strength to withstand high inflation forces and to resist tearing and abrasion. Inflatable devices have typically been manufactured from woven materials, but the present assignee has technology relating to the use of nonwoven materials to create inflatable devices as well. Both options are possible and considered within the scope of this disclosure. Non-limiting examples of materials that may be used to form the base substrate, patch, and/or reinforcement gusset elements described may be polyamide (nylon), polyurethane, vinyl, polyethylene, polypropylene, polyamide, polyethylene terephthalate (PET), polystyrene, ethylene vinyl acetate (EVOH), polyvinylidene chloride (PVDC), polycarbonate (PC), polyvinyl chloride (PVC), or any combination thereof; any woven, nonwoven, knitted, or film-based substrate, any combinations thereof, or any other appropriate materials. It should be understood that the industry is exploring other materials in connection with life rafts and other inflatable structures, and that such materials may be used to form the structures described herein.

The material may have a coating on both sides, on only on side, or it may be uncoated. If one or more coatings are provided, they may provide bonding, welding, or abrasion resistance, or other properties. In a specific embodiment, the material may be a polyurethane-coated nylon. The polyurethane may be coated on a single side. In an alternate example, the nylon may be coated on both sides with polyurethane. In another specific embodiment, the material may be neoprene coated. In another specific embodiment, the material may be a woven nylon with one or more marine-based coatings that protect the material from salt and other potentially corrosive atmospheric conditions. In another specific embodiment, the material may be any appropriate material that is used in a marine operation, such as materials used to form life jackets, materials used to form life rings, or any other appropriate materials.

Dimensions:

The resulting dimensions of the base substrate 10 and accompanying components may vary. For exemplary purposes only, consider that if the base substrate is 4 inches wide, it is generally expected that two inches will form the welded portion 23 and two inches will form the extending flaps 18, 20. The resulting reinforcement gusset elements will be similarly sized and shaped; for example, a four inch strip with two inches defining the individual gussets 38 and two inches defining the external strip 42. Other dimensions are possible and considered within the scope of this disclosure. For example, the base substrate may be two inches, 1.5 inches, 1 inch, 0.5 inch, or smaller, with the resulting weld 23, flaps 18, 20, gussets 38, and external strips 42 of the reinforcement gusset elements 24 being half of the base substrate dimension.

It is also possible for the dimensions to differ, such that the gussets and reinforcement strip extend further than the extending flaps. It is also possible for the reinforcement gusset element to have cuts 32 and a fold mark 36 made so that the fold mark 36 is not directly bisecting the material but offset, with one portion (gusset of strip) being formed longer than the other.

Changes and modifications, additions and deletions may be made to the structures and methods recited above and shown in the drawings without departing from the scope or spirit of the disclosure or the following claims.

What is claimed is:

1. A welded reinforcement, comprising:
   a flexible base substrate material comprising a crotch portion, the crotch portion created without adhesives and defining a geometry with at least one curve or angle;
   a first gusset reinforcement element comprising a plurality of gusset cuts, the first gusset reinforcement element configured to fit within the crotch portion and to be welded in place without the use of adhesives, wherein the first gusset reinforcement element comprises at least one non-coated surface facing externally from the crotch portion, further comprising at least one coated surface of the first gusset reinforcement element facing toward the base substrate material, wherein the at least one coated surface of the first gusset reinforcement element comprises a weldable gas barrier coating.

2. The welded reinforcement of claim 1, wherein the coating comprises polyamide (nylon), polyurethane, vinyl, polyethylene, polypropylene, polyamide, polyethylene terephthalate (PET), polystyrene, ethylene vinyl acetate (EVOH), polyvinylidene chloride (PVDC), polycarbonate (PC), polyvinyl chloride (PVC), or any combination thereof.

3. A welded reinforcement, comprising:
a flexible base substrate material comprising a crotch portion, the crotch portion created without adhesives and defining a geometry with at least one curve or angle;
a first gusset reinforcement element comprising a plurality of gusset cuts, the first gusset reinforcement element configured to fit within the crotch portion and to be welded in place without the use of adhesives, wherein the first gusset reinforcement element comprises at least one non-coated surface facing externally from the crotch portion, further comprising a second gusset reinforcement element interposed between the base substrate and the first gusset reinforcement element, the second gusset reinforcement element comprising a coating on its upper surface and a coating on its lower surface.

4. The welded reinforcement of claim 3, wherein the crotch portion of the base substrate material is created by welding with a heated die.

5. A welded reinforcement, comprising:
a flexible base substrate material comprising a crotch portion, the crotch portion created without adhesives and defining a non-linear dimension;
a first gusset reinforcement element comprising upper and lower coated surfaces, an interior portion of the first gusset reinforcement element comprising a plurality of individual gussets formed by gusset cuts, the first gusset reinforcement element configured to fit within the crotch portion; and
a second gusset reinforcement element comprising a non-coated surface, the non-coated surface facing outwardly and configured to fold upon itself upon application of a welding process, an interior portion of the second gusset reinforcement element comprising a plurality of individual gussets formed by gusset cuts, the second gusset reinforcement element configured to fit around the first gusset reinforcement element in the crotch portion.

6. The welded reinforcement of claim 5, wherein the individual gussets of the first gusset reinforcement element face opposite the individual gussets of the second gusset reinforcement element.

7. A welded reinforcement used for attaching an inflatable structure to one or more additional inflatable structures or to an accessary, the welded reinforcement comprising:
a flexible base substrate material comprising two material layers welded along an interior welded portion to create a crotch seal around an interior space, the crotch seal forming a point of a V and the two material layers forming sides of the V;
a first gusset reinforcement element comprising a folded structure defined by a plurality of gusset cuts separated from an external strip via a fold line, the fold line of the first gusset reinforcement element configured to fit within the V of the crotch portion such that (1) individual gussets created by the plurality of gusset cuts abut one of the two material layers of the flexible substrate and (2) the external strip abuts the other of the two material layers of the flexible substrate, the first gusset element configured to be folded in a way that places it in shear failure mode and welded in place without the use of adhesives.

8. The welded reinforcement of claim 7, further comprising at least one additional gusset reinforcement element.

9. The welded reinforcement of claim 7, wherein the crotch portion defines a non-linear dimension.

10. The welded reinforcement of claim 7, wherein the first gusset reinforcement element comprises at least one non-coated surface facing externally from the crotch portion.

11. The welded reinforcement of claim 10, wherein the first gusset reinforcement element is positioned such that the at least one non-coated surface is folded upon itself when the reinforcement seal is compressed and welded.

12. The welded reinforcement of claim 7, wherein the crotch seal is created without adhesives and defines a geometry with at least one curve or angle.

13. A method of attaching one or more inflatable structures to another inflatable structure, comprising:
providing the welded reinforcement of claim 7;
installing the welded reinforcement on a first inflatable structure in order to attach the first inflatable structure to a second inflatable structure.

14. A method of attaching one or more inflatable structures to an accessory, comprising:
providing the welded reinforcement of claim 7;
installing the welded reinforcement on a first inflatable structure in order to attach the first inflatable structure to an accessory.

15. The method of claim 14, wherein the accessory comprises an inflation port, a sliding surface, a raft floor, a handle, a girt, or a canopy.

16. A welded reinforcement used for attaching an inflatable structure to one or more additional inflatable structures or to an accessary, the welded reinforcement comprising:
a flexible base substrate material comprising two material layers welded along an interior welded portion to create a crotch seal, the crotch seal forming a point of a V and the two material layers forming sides of the V;
a first gusset reinforcement element comprising a plurality of gusset cuts separated from an external strip via a fold line, the fold line of the first gusset reinforcement element configured to fit within the V of the crotch portion such that (1) individual gussets created by the plurality of gusset cuts abut one of the two materials of the flexible substrate and (2) the external strip abuts the other of the two materials of the flexible substrate, the first gusset element configured to be welded in place without the use of adhesives,
wherein at least one surface of the welded reinforcement comprises a weldable gas barrier coating.

* * * * *